United States Patent
Tuers et al.

(10) Patent No.: US 9,459,881 B2
(45) Date of Patent: Oct. 4, 2016

(54) STORAGE MODULE AND METHOD FOR IMPROVING BOOT TIME DURING BLOCK BINARY SEARCHES

(71) Applicant: SanDisk Technologies Inc., Plano, TX (US)

(72) Inventors: Daniel E. Tuers, Kapaa, HI (US); Dana Lee, Saratoga, CA (US); Abhijeet Manohar, Bangalore (IN); Yosief Ataklti, Fremont, CA (US)

(73) Assignee: SanDisk Technologies LLC, Plano, TX (US)

( * ) Notice: Subject to any disclaimer, the term of this patent is extended or adjusted under 35 U.S.C. 154(b) by 239 days.

(21) Appl. No.: 14/278,782

(22) Filed: May 15, 2014

(65) Prior Publication Data

US 2015/0261613 A1    Sep. 17, 2015

(30) Foreign Application Priority Data

Mar. 13, 2014    (IN) .......................... 845/MUM/2014

(51) Int. Cl.

| | |
|---|---|
| *G06F 13/10* | (2006.01) |
| *G06F 9/44* | (2006.01) |
| *G06F 3/06* | (2006.01) |
| *G06F 12/02* | (2006.01) |

(52) U.S. Cl.
CPC ........... *G06F 9/4401* (2013.01); *G06F 3/0601* (2013.01); *G06F 12/0246* (2013.01); *G06F 2212/1016* (2013.01); *G06F 2212/7204* (2013.01); *G06F 2212/7206* (2013.01)

(58) Field of Classification Search
None
See application file for complete search history.

(56) References Cited

U.S. PATENT DOCUMENTS

| | | | |
|---|---|---|---|
| 2014/0304560 A1* | 10/2014 | Narasimha .......... | G06F 11/0727 714/704 |
| 2015/0006939 A1* | 1/2015 | Lim ....................... | G11C 5/148 713/324 |
| 2015/0036431 A1* | 2/2015 | Park ....................... | G11C 16/26 365/185.12 |

* cited by examiner

*Primary Examiner* — Ilwoo Park
(74) *Attorney, Agent, or Firm* — Brinks Gilson & Lione (57) ABSTRACT

A storage controller is configured to find a last-written page in a block in a memory by sending a command to the memory to read a page of data, receiving at least some of the data from that page, and analyzing the at least some of the data from that page to determine if that page is a written page. In one embodiment, the storage controller instructs the memory to read the page of data using a sense time that is shorter than a sense time used to read a page of data in response to a read request from a host controller. Additionally or alternatively, the amount of the data received by the storage controller can be less than the amount of data received when reading a page of data in response to a read request from a host controller.

34 Claims, 8 Drawing Sheets

| | Standard | Reduced Toggle | Reduced Sense | Reduced Toggle and Sense | |
|---|---|---|---|---|---|
| Number of blocks to search | 6 | 6 | 6 | 6 | Blocks |
| Number of reads to find last written page | 9 | 9 | 9 | 9 | reads |
| Sense time per read | 40 | 40 | 15 | 15 | us |
| Toggle Time Per Read (currently 4KB) | 11 | NA | 11 | NA | us |
| Toggle Time Per Read (newly proposed, 100B) | NA | 0.25 | NA | 0.25 | us |
| 1s counted by DMC to determine erased (no overhead) | NA | NA | NA | NA | us |
| Total Time | 2754 | 2173.5 | 1404 | 823.5 | us |

|  | Standard | Reduced Toggle | Reduced Sense | Reduced Toggle and Sense | |
|---|---|---|---|---|---|
| Number of blocks to search | 6 | 6 | 6 | 6 Blocks | |
| Number of reads to find last written page | 9 | 9 | 9 | 9 | reads |
| Sense time per read | 40 | 40 | 15 | 15 | us |
| Toggle Time Per Read (currently 4KB) | 11 | NA | 11 | NA | us |
| Toggle Time Per Read (newly proposed, 100B) | NA | 0.25 | NA | 0.25 | us |
| 1s counted by DMC to determine erased (no overhead) | NA | NA | NA | NA | us |
| Total Time | 2754 | 2173.5 | 1404 | 823.5 | us |

STORAGE MODULE AND METHOD FOR IMPROVING BOOT TIME DURING BLOCK BINARY SEARCHES

PRIORITY

This application claims priority to India Patent Application No. 845/MUM/2014, filed on Mar. 13, 2014, entitled "Storage Module and Method for Improving Boot Time During Block Binary Searches," the entire disclosure of which is hereby incorporated by reference.

BACKGROUND

Many storage modules contain a controller and one or more memory units (e.g., NAND dies). When the storage module boots up, the storage module performs several functions, such as attempting to find the last written page in each of the open blocks in memory. To find the last written page, the controller can perform a binary search technique in which the controller reads various pages in the open block in a guess-and-check fashion until it finds the last written page. In this process, the controller commands the memory unit to read a certain page of data. In response to this command, the memory unit senses the memory cells in the page and stores them in latches in the memory unit. The controller then reads the data out of the latches (a process known as "toggling") and counts the number of 0s and/or 1s in the read-out data and compares the number to some threshold to determine whether or not that page was written with data. Since pages are typically written sequentially in the block, the controller can follow a "funnel" approach in which the controller reads pages in various locations in the block (e.g., half way down the block, then a quarter way down the block, then an eighth way down the block, etc.) until the controller finds the last written page. This process is repeated for each open block in the memory. Once the last written page is located for each open block, the storage module is ready to accept commands from the host controller. Typically, a storage module will have a target boot time (e.g., 40 ms) from power on reset to being able to accept the first host command.

OVERVIEW

Embodiments of the present invention are defined by the claims, and nothing in this section should be taken as a limitation on those claims.

By way of introduction, the below embodiments relate to a storage module and method for improving boot time during block binary searches. In one embodiment, a storage module is provided comprising a memory and a storage controller. The storage controller is configured to find a last-written page in a block in the memory by (a) sending a command to the memory to read a page of data, (b) receiving at least some of the data from that page in response to the command, (c) analyzing the at least some of the data from that page to determine if that page is a written page, and (d) repeating (a)-(c) for different pages in the block until the last-written page is found. In one embodiment, the storage controller instructs the memory to read the page of data using a sense time that is shorter than a sense time used to read a page of data in response to a read request from a host controller. Additionally or alternatively, the amount of data received by the storage controller can be less than the amount of data received when reading a page of data in response to a read request from a host controller.

Other embodiments are possible, and each of the embodiments can be used alone or together in combination. Accordingly, various embodiments will now be described with reference to the attached drawings.

DETAILED DESCRIPTION OF THE PRESENTLY PREFERRED EMBODIMENTS

As mentioned in the background section above, finding the last written page for each open block of memory in a storage module using a block binary search can result in a relatively long boot time. The following embodiments can be used to improve boot time during block binary searches and better meet target boot times. Before turning to these and other embodiments, the following paragraphs provide a discussion of exemplary storage modules that can be used with these embodiments. Of course, these are just examples, and other suitable types of storage modules can be used.

Figure 1:
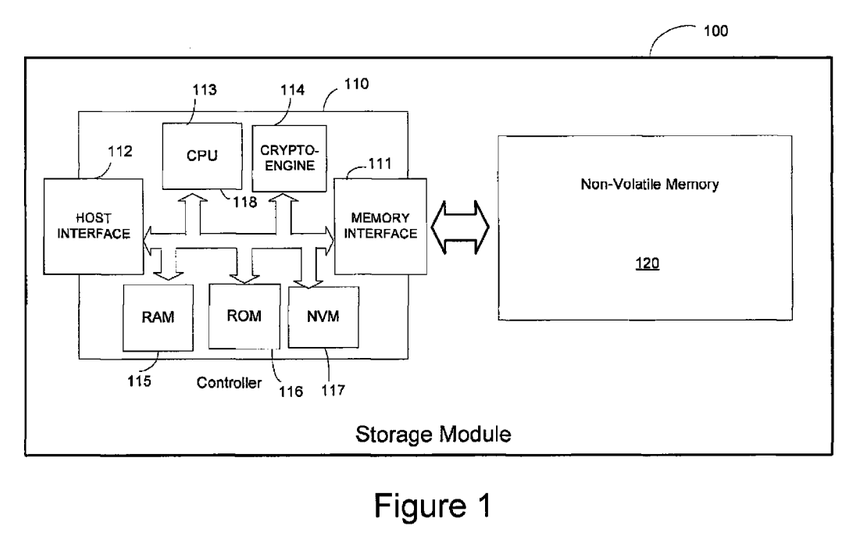
FIG. 1 is a block diagram of an exemplary storage module of an embodiment.

As illustrated in FIG. 1, a storage module 100 of one embodiment comprises a storage controller 110 and non-volatile memory 120. The storage controller 110 comprises a memory interface 111 for interfacing with the non-volatile memory 120 and a host interface 112 for placing the storage module 100 operatively in communication with a host controller. As used herein, the phrase "operatively in communication with" could mean directly in communication with or indirectly in (wired or wireless) communication with through one or more components, which may or may not be shown or described herein.

Figure 2A:
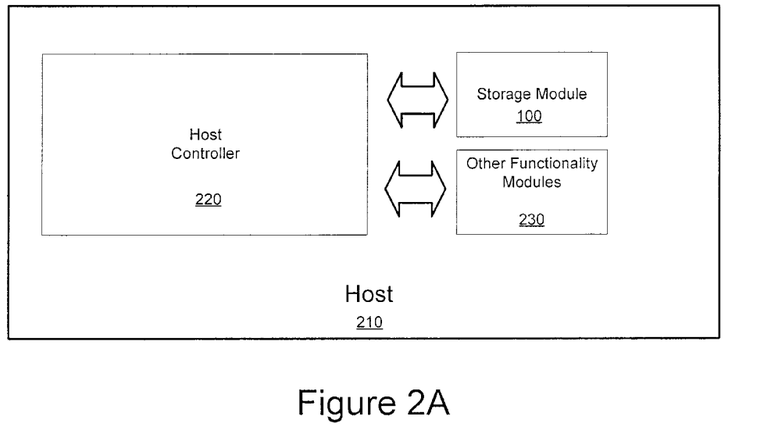
FIG. 2A is a block diagram of a host of an embodiment, where the exemplary storage module of FIG. 1 is embedded in the host.

As shown in FIG. 2A, the storage module 100 can be embedded in a host 210 having a host controller 220. That is, the host 210 embodies the host controller 220 and the storage module 100, such that the host controller 220 interfaces with the embedded storage module 100 to manage its operations. For example, the storage module 100 can take the form of an iNAND™ eSD/eMMC embedded flash drive by SanDisk Corporation, or, more generally, any type of solid state drive (SSD), a hybrid storage device (having both a hard disk drive and a solid state drive), and a memory caching system. The host controller 220 can interface with the embedded storage module 100 using, for example, an eMMC host interface or a UFS interface. The host 210 can take any form, such as, but not limited to, a mobile phone, a tablet computer, a digital media player, a game device, a personal digital assistant (PDA), a mobile (e.g., notebook, laptop) personal computer (PC), or a book reader. As shown in FIG. 2A, the host 210 can include optional other functionality modules 230. For example, if the host 210 is a mobile phone, the other functionality modules 230 can include hardware and/or software components to make and place telephone calls. As another example, if the host 210 has network connectivity capabilities, the other functionality modules 230 can include a network interface. Of course, these are just some examples, and other implementations can be used. Also, the host 210 can include other components (e.g., an audio output, input-output ports, etc.) that are not shown in FIG. 2A to simplify the drawing. It should be noted that while the host controller 220 can control the storage module 100, the storage module 100 can have its own controller to control its internal memory operations.

Figure 2B:
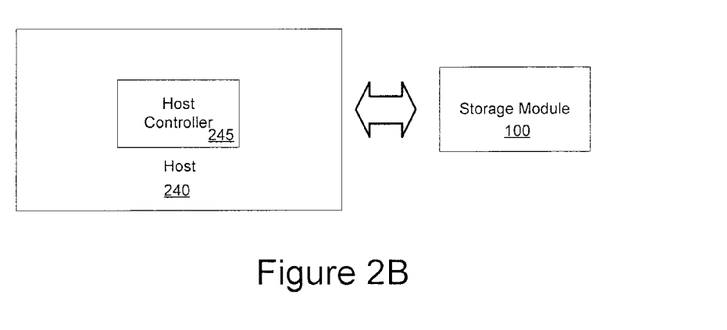
FIG. 2B is a block diagram of the exemplary storage module of FIG. 1 removably connected to a host, where the storage module and host are separable, removable devices.

As shown in FIG. 2B, instead of being an embedded device in a host, the storage module 100 can have physical and electrical connectors that allow the storage module 100 to be removably connected to a host 240 (having a host controller 245) via mating connectors. As such, the storage module 100 is a separate device from (and is not embedded in) the host 240. In this example, the storage module 100 can be a handheld, removable memory device, such as a Secure Digital (SD) memory card, a microSD memory card, a Compact Flash (CF) memory card, or a universal serial bus (USB) device (with a USB interface to the host), and the host 240 is a separate device, such as a mobile phone, a tablet computer, a digital media player, a game device, a personal digital assistant (PDA), a mobile (e.g., notebook, laptop) personal computer (PC), or a book reader, for example.

In FIGS. 2A and 2B, the storage module 100 is in communication with a host controller 220 or host 240 via the host interface 112 shown in FIG. 1. The host interface 112 can take any suitable form, such as, but not limited to, an eMMC host interface, a UFS interface, and a USB interface. The host interface 110 in the storage module 110 conveys memory management commands from the host controller 220 (FIG. 2A) or host 240 (FIG. 2B) to the storage controller 110, and also conveys memory responses from the storage controller 110 to the host controller 220 (FIG. 2A) or host 240 (FIG. 2B). Also, it should be noted that when the storage module 110 is embedded in the host 210, some or all of the functions described herein as being performed by the storage controller 110 in the storage module 100 can instead be performed by the host controller 220.

Returning to FIG. 1, the storage controller 110 comprises a central processing unit (CPU) 113, an optional hardware crypto-engine 114 operative to provide encryption and/or decryption operations, read access memory (RAM) 215, read only memory (ROM) 116 which can store firmware for the basic operations of the storage module 100, and a non-volatile memory (NVM) 117 which can store a device-specific key used for encryption/decryption operations, when used. The storage controller 110 can be implemented in any suitable manner. For example, the storage controller 110 can take the form of a microprocessor or processor and a computer-readable medium that stores computer-readable program code (e.g., software or firmware) executable by the (micro)processor, logic gates, switches, an application specific integrated circuit (ASIC), a programmable logic controller, and an embedded microcontroller, for example. Suitable controllers can be obtained from SanDisk or other vendors. The storage controller 110 can be configured with hardware and/or software to perform the various functions described below and shown in the flow charts. Also, some of the components shown as being internal to the storage controller 110 can also be stored external to the storage controller 110, and other component can be used. For example, the RAM 115 (or an additional RAM unit) can be located outside of the controller die and used as a page buffer for data read from and/or to be written to the memory 120.

The non-volatile memory 120 can also take any suitable form. For example, in one embodiment, the non-volatile memory 120 takes the form of a solid-state (e.g., flash) memory and can be one-time programmable, few-time programmable, or many-time programmable. The non-volatile memory 120 can also use single-level cell (SLC), multiple-level cell (MLC), triple-level cell (TLC), or other memory technologies, now known or later developed. Also, the non-volatile memory 120 can be a two-dimensional memory or a three-dimensional memory.

Figure 3:
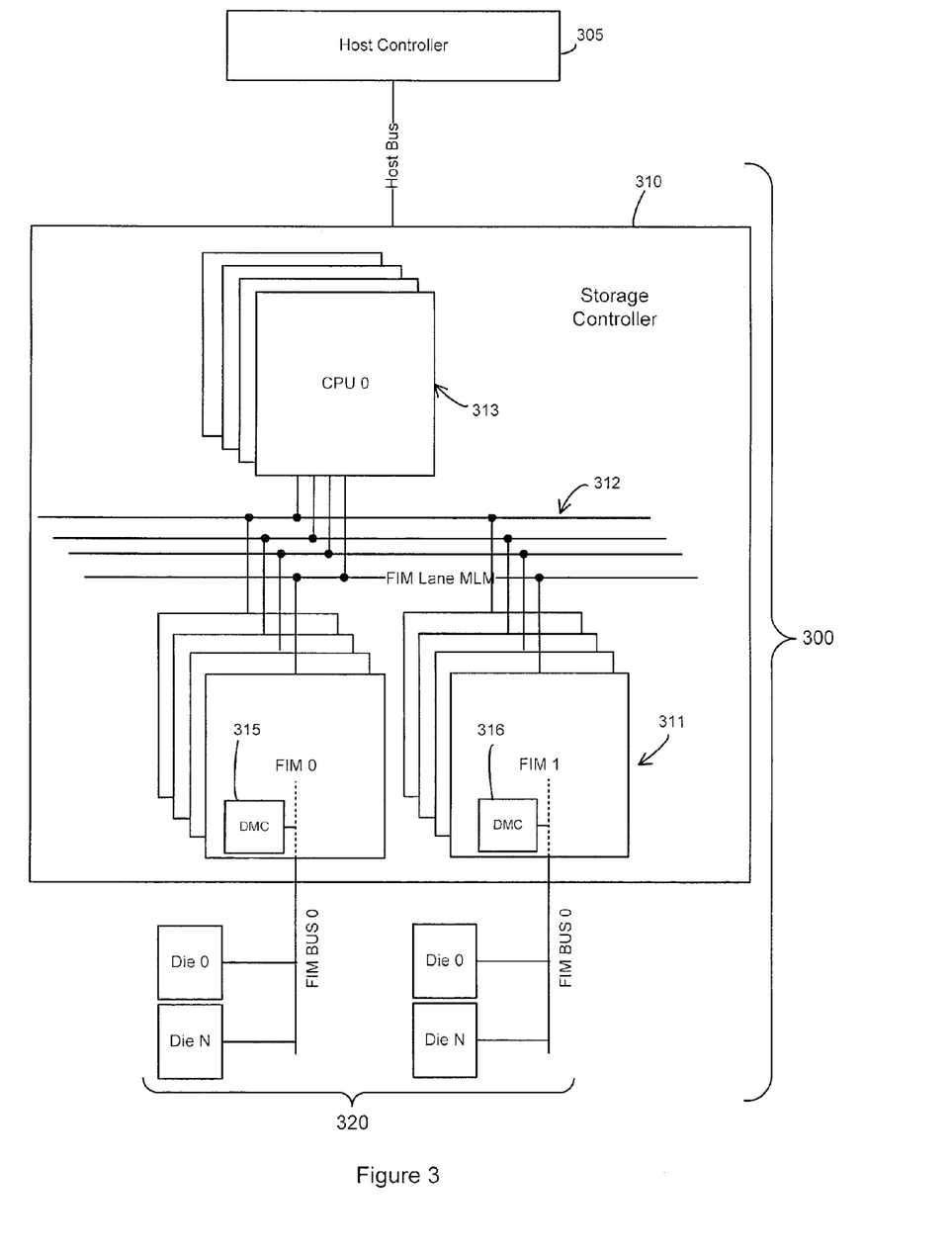
FIG. 3 is a block diagram of an exemplary storage module of an embodiment.

Turning again to the drawings, FIG. 3 is a diagram of another exemplary storage module 300 of an embodiment. This storage module 300 comprises a storage controller 310 in communicate with a plurality of memory dies 320. The storage controller 310 comprises a plurality of CPUs 313 in communication with a plurality of Flash interface modules (FIMs) via a plurality of buses 312. Each FIM is in communication with one or more memory dies 320 via a bus. Also, each FIM has a data mis-compare counter (DMC) 315, 316 that can count 1s and/or 0s in data read from the memory dies 320. The DMCs are used in block binary searches to find the last written page for each open block of memory. This process is described in more detail below and in conjunction with FIGS. 4 and 5.

Figure 4:
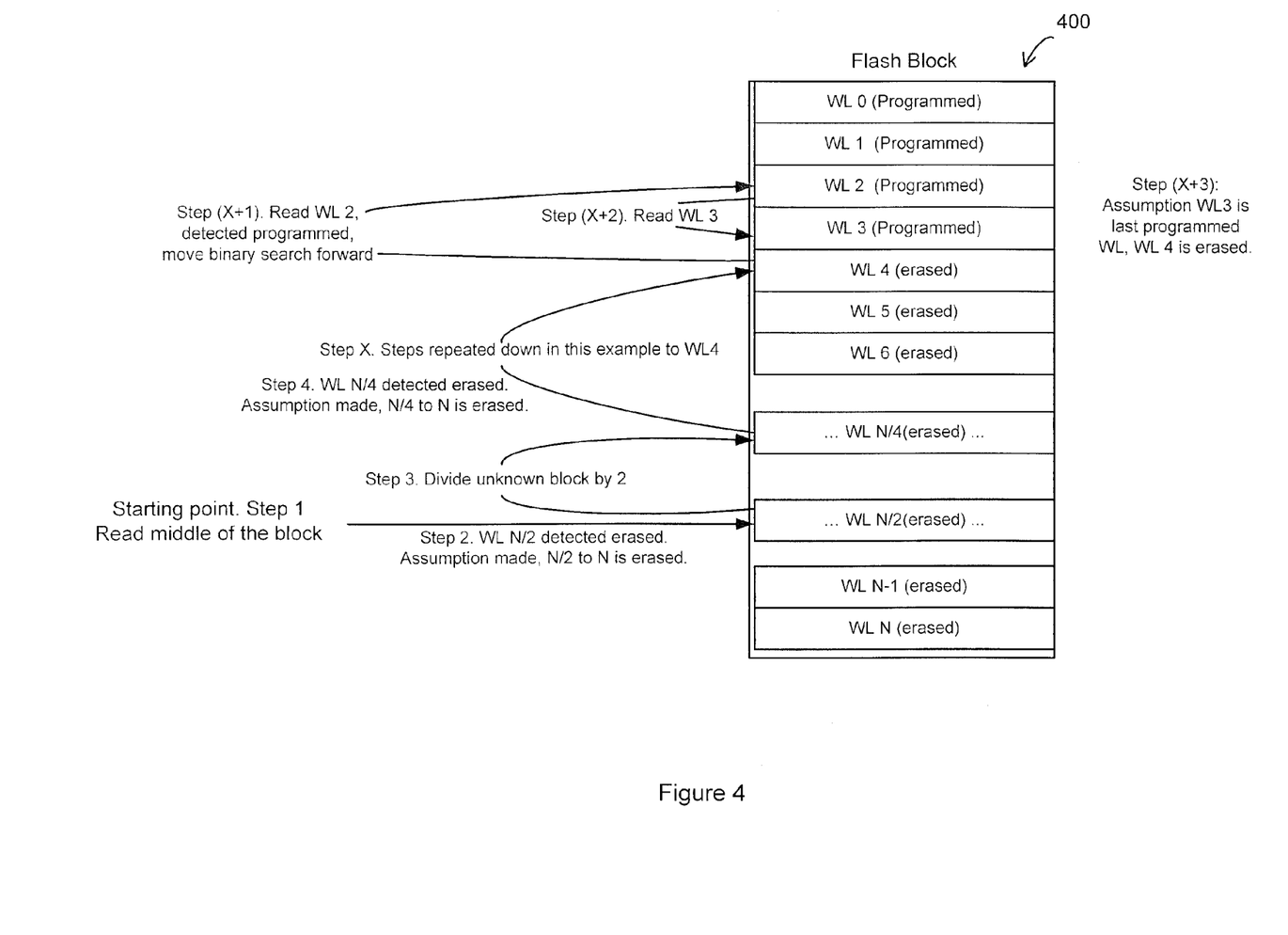
FIG. 4 is a diagram that illustrates the use of a block binary search to find a the last written page for each open block of memory.
Figure 5:
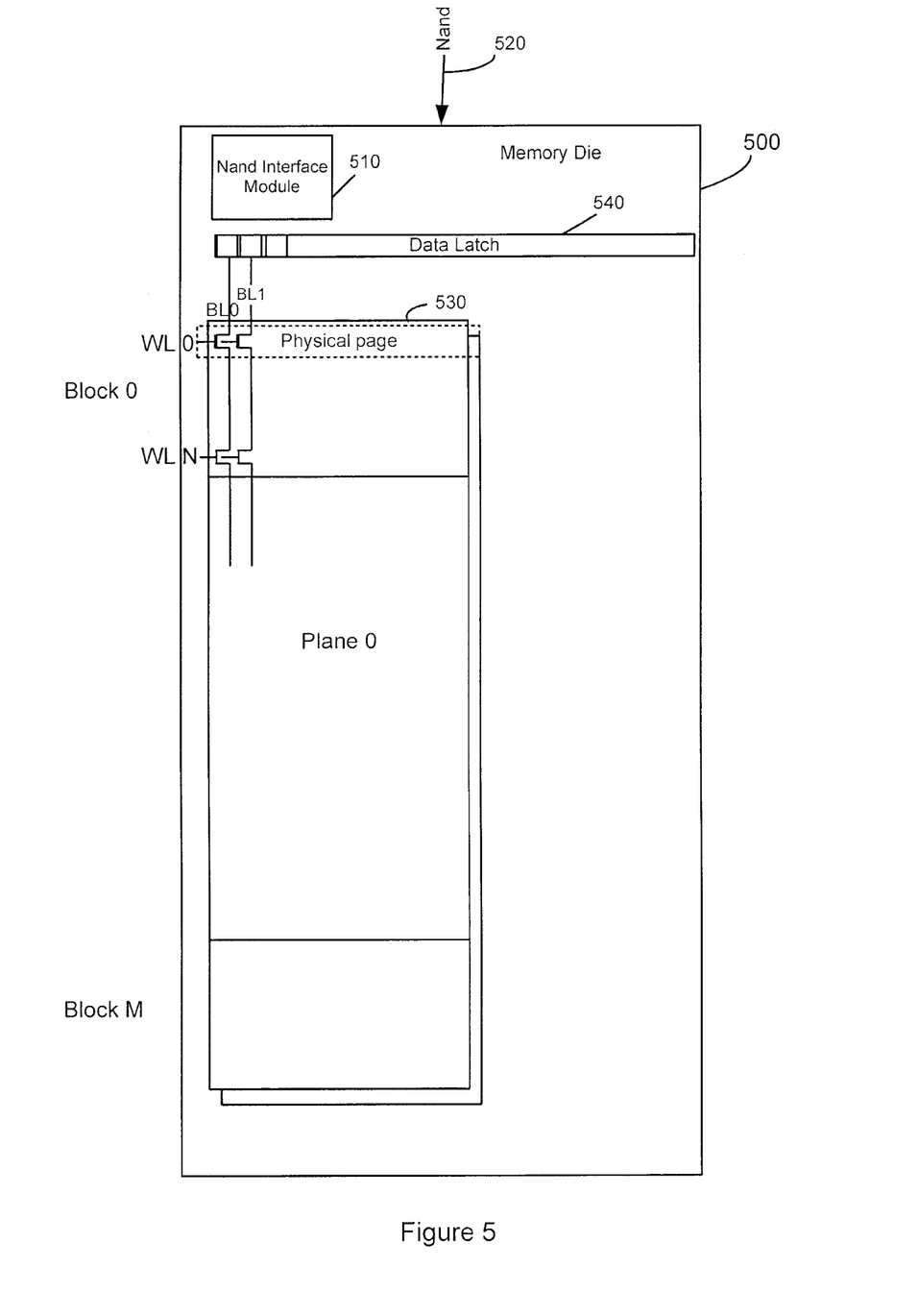
FIG. 5 is a diagram of a memory die of an embodiment.

FIG. 4 illustrates a Flash block 400 in the memory die 500 shown in FIG. 5 (the memory die 500 has M blocks in each plane of memory, and there can be one or more planes of memory). In this block 400, wordlines 0-3 are programmed, and wordlines 4-N are erased, where each wordline corresponds to a page in the block 400. The storage controller 310 knows (e.g., via a stored pointer) which of the blocks in the memory die 500 are open (i.e., have unwritten pages). For example, of 32,000 blocks in memory, there may only be 12 open blocks.

To find the last-written page in the block 400 (here, wordline 3), a binary block search is performed in which the storage controller 310 sends a command via the NAND bus 520 to the memory die 500 to read a page of data (the memory die 500 receives the command via a NAND interface module 510). To read the page, the memory die 500 powers the wordline associated with the page and then powers each of the bitlines in the page to sense the data value stored in each of the memory cells in the page. Those data values are stored in a volatile data latch 540, where they reside until the storage controller 100 reads the values out of the latch 540 in a process known as "toggling" the data.

When the storage controller 310 receives the data toggled from the data latch 540, the storage controller 310 analyzes the data to determine if that page is a written page (e.g., using the DMC counters to count the number of 0s or 1s in a page, where 1 represents an unwritten memory cell in this example). This process is repeated for different pages in the block until the last-written page is found. For example, in the illustration in FIG. 4, step 1 of the process is to read the middle of the block (wordline N/2) to see whether or not it contains a programmed page. In step 2, the storage controller 310 detects that wordline N/2 is not erased, so it assumes that wordlines N/2 to N are erased, as programming is done sequentially in this example. In step 3, the storage controller 310 divides the wordline number by 2 and reads that page, but that wordline is also erased. So, in step 4, the storage controller 310 divides the wordline number by 4 and reads that page, but that wordline is also erased. This process is repeated until, eventually, a programmed wordline is found, which here, is wordline 4. The storage controller 310 looks at another wordline (here, wordline 2) and sees that it is programmed. Finally, the storage controller 310 sees that wordline 3 is programmed, so it knows that, because wordline 4 is unprogrammed, wordline 3 must contain the last written page. If the storage module 300 supports partial-page programming (e.g., for SLC cells) and only part of a wordline is programmed, the storage controller 310 can read the entire wordline to detect where the last programmed memory cells are in the wordline.

As mentioned above, this process of finding the last written page for each open block of memory in a storage module using block binary searches can take a relatively long time, and a short boot time is desired. For example, a storage module may need to meet a boot time of 40 mS from power on reset to being able to accept the first host command. Within that 40 mS time budget, the back-end CPU may be allocated 5 ms to prepare the media management layer (MML), which is the firmware code responsible for logical-to-physical address translation. If the storage module 300 has multiple back-end CPUs running in parallel, each back-end CPU is budgeted the full 5 mS. Also, if each back-end CPU is managing multiple Flash interface modules (FIMs), the FIMs may require some CPU interaction (e.g., to manage the accelerators) and will run the operations slightly in parallel.

In prior approaches to find the last-written page, the storage controller senses a page (using a MLC or SLC sense) then toggles a full error correction code (ECC) codeword of data (e.g., 4 KB, which includes both data and parity bits)) and counts the number of 1s in the page to detect if the page is erased (some senses may be done within a physical page if the write is to an SLC block and the design supports partial page programming). The number of 1s is compared against a threshold to determine if the data is erased. The data is not decoded by the low density parity check (LDPC) engine, so integrity of the data is not critical.

To reduce the time spend finding the last-written page, these embodiments recognize that a "rough" sense can be performed (as compared to a "normal" sense that would be performed when a host controller is requesting data to be read) to indicate whether or not data is programmed to a given wordline. This can done by changing the parameters that control the settling time to trade off speed vs. accuracy. The concept is that the system is not trying to resolve detailed er/A/B/C states with low error rates. The system simply needs a rough approximation of whether the data has been programmed or not. The storage controller 310 can changes the Flash sense parameters via a command from the storage controller 310 to the memory die. The storage controller 310 can change these NAND parameters only for the erase detection operation, and, after the erased detection operation, can revert the parameters back to a normal sense.

These embodiments recognize that the storage controller 310 can tolerate some errors in the settled waveforms for faster waveforms by lowering the bitline settling times. The margins in case of an all-FFh pattern (erase) are better compared to a random pattern, and so, this is an advantage in determining an erased page. All settling times can be reduced to remove the margins that are normally associated with achieving a low bit error rate of MLC sensing. Also, for erase detection, MLC pages can be sensed as SLC pages (since only one threshold is used between the ER and A states), when MLC memory would normally have 3 thresholds Er-A, A-B, B-C.

Since accuracy of the data is not a concern in detecting the last-written page, the objective of the storage controller 310 really is to detect the presence (or absence) of data and not to decode the data itself. So, in one embodiment, the storage controller 310 instructs the memory to read a page of data using a sense time that is shorter than a sense time used to read a page of data in response to a read request from a host controller. For example, the storage controller 310 can instruct the memory to read the page of data using a sense time of about 15 micro-seconds, wherein the sense time used to read a page of data in response to a read request from a host controller can be about 40 micro-seconds. The memory still toggles the data to the storage controller 310 so that the data will be counted by the data mis-compare counter (DMC) part of the controller. It is expected that the data integrity of this quick sense will be less and may will require a new set of DMC thresholds to compare against (i.e., because the embodiment introduces a level of noise in the sense, the DMC thresholds may need to reflect the less-accurate reads).

In addition to or instead of reducing the sense time when reading data for the purposes of finding the last-written page, the amount of data toggled back to the storage controller 310 from the memory can be less than when reading a page of data in response to a read request from a host controller. The storage controller 310 can do this simply by controlling how much data it strobes out of the latches. For example, if the data returned from a "normal" read is about 4 KB, the data returned from a "rough" read can be about 100 bytes. (In this example, one page contains 8 or 16 KB of data, and one block has 128 wordlines, where each wordline is a page.) For example, instead of toggling out the entire error correction code (ECC) codeword, the storage controller 310 can instead toggle out just the parity bits of the ECC codeword. As the parity bits are typically randomly distributed, the storage controller 310 can sample this small subsection of the codeword and still determine whether or not the page is written.

Figure 6:
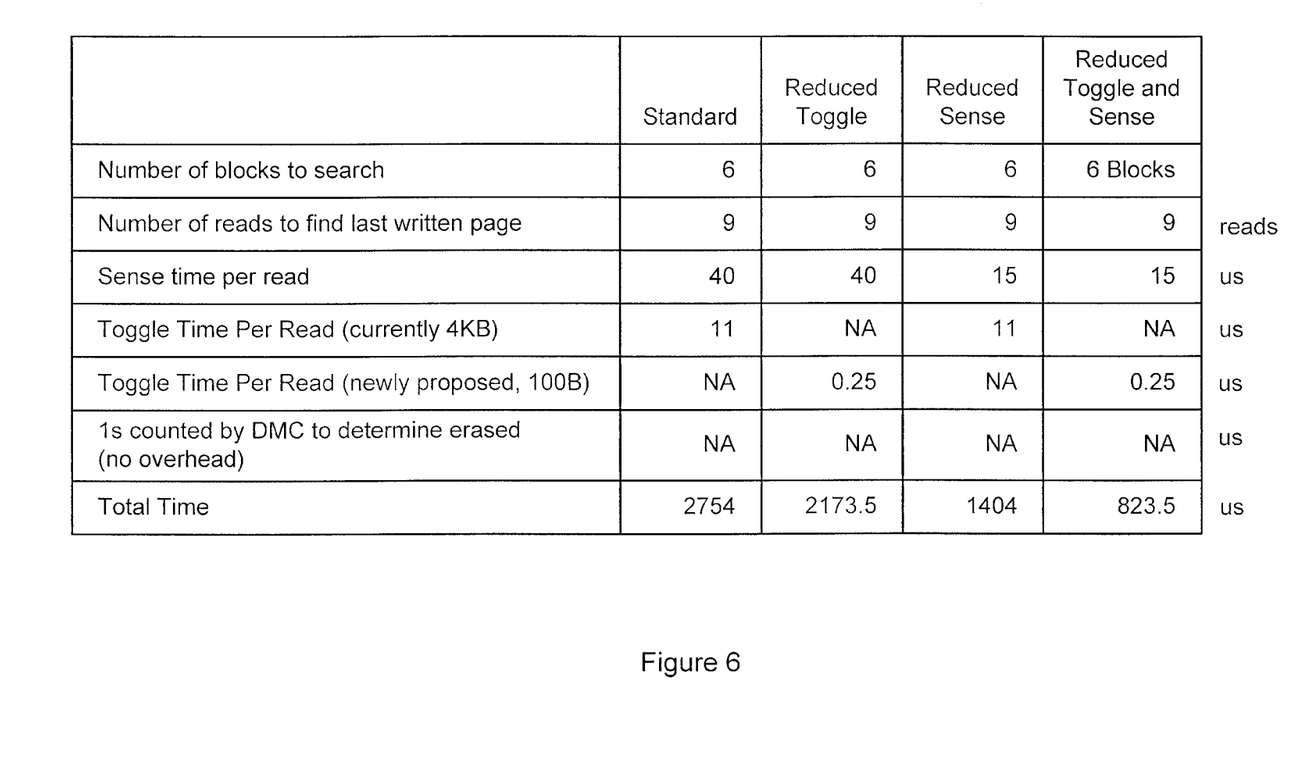
FIG. 6 is a chart illustrating the advantages of an embodiment.

FIG. 6 is a chart that illustrates the advantages of these embodiments. This chart assumes that the memory has six open blocks and that the storage controller 310 will require nine reads to find the last-written page. As shown in the third line in the chart, a standard read (e.g., to read a page of data in response to a read request from a host controller) takes 40 micro-seconds, wherein the reduced sense time in this example is 15 micro-seconds. Additionally or alternatively, the amount of data toggled per read can be reduced from 4 KB to 100 bytes. This chart also shows that, because the DMC counts the ones as the data is coming across the bus, there is no time overhead in the counting process. The net result is a reduction from 2,754 micro-seconds to 2,173.5 micro-seconds if only reduced toggle is used, 1,404 micro-seconds if only reduced sense is used, and 823.5 micro-seconds if both reduced toggle and reduced sense are used. Thus, the use of these embodiments greatly reduces the boot time, helping ensure that the boot requirements are met faster, so the storage controller 310 can service host commands sooner.

Figure 7:
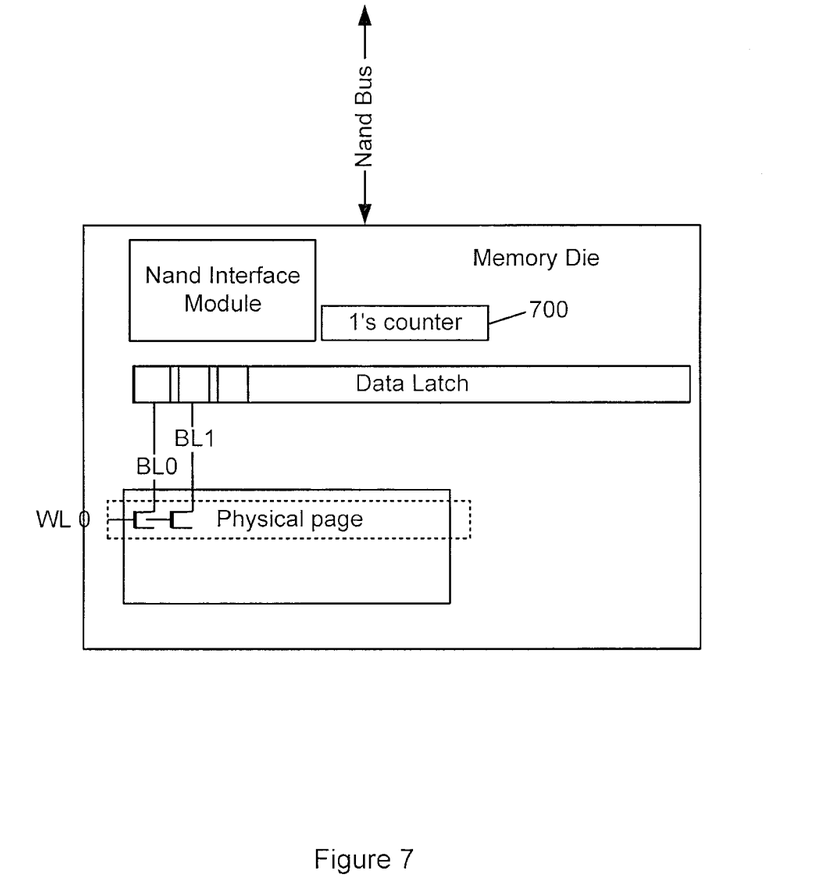
FIG. 7 is a diagram of a memory die of another embodiment.
Figure 8:
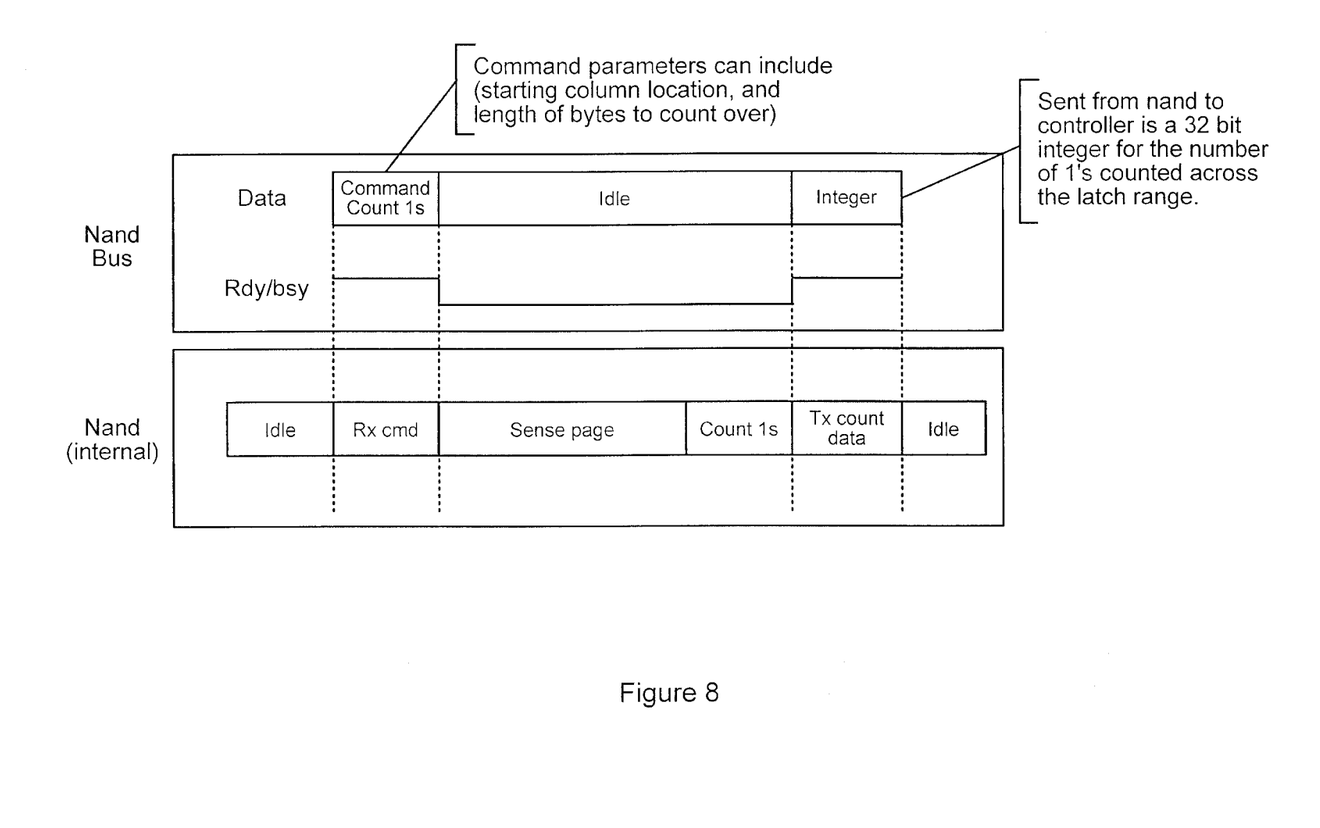
FIG. 8 is a timing chart of an embodiment.

There are many alternatives that can be used with these embodiments. For example, to avoid toggling any data at all, the memory die itself can contain a counter 700 to enable even faster detection of the last-written page (see FIG. 7). As shown in the timing diagram in FIG. 8, the storage controller 310 can provide the block number to the memory die, and the memory die can scan the wordlines internally to locate the last-written page. More specifically, the NAND can scan the wordlines and count the 1s internally and produce the count to the storage controller 310 (as opposed to the NAND doing a binary and linear search). This means the high-level intelligence stays in the storage controller 310, but the counting is done internal to the NAND, which frees the NAND bus from the transfer.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Furthermore, each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles or a charge storage dielectric material.

Multiple memory elements may be configured so that they are connected in series or such that each element is individually accessible. By way of non-limiting example, NAND devices contain memory elements (e.g., devices containing a charge storage region) connected in series. For example, a NAND memory array may be configured so that the array is composed of multiple strings of memory in which each string is composed of multiple memory elements sharing a single bit line and accessed as a group. In contrast, memory elements may be configured so that each element is individually accessible, e.g., a NOR memory array. One of skill in the art will recognize that the NAND and NOR memory configurations are exemplary, and memory elements may be otherwise configured.

The semiconductor memory elements of a single device, such as elements located within and/or over the same substrate or in a single die, may be distributed in two or three dimensions, such as a two dimensional array structure or a three dimensional array structure.

In a two dimensional memory structure, the semiconductor memory elements are arranged in a single plane or single memory device level. Typically, in a two dimensional memory structure, memory elements are located in a plane (e.g., in an x-z direction plane) which extends substantially parallel to a major surface of a substrate that supports the memory elements. The substrate may be a wafer over which the layers of the memory elements are deposited and/or in which memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arranged in non-regular or non-orthogonal configurations as understood by one of skill in the art. The memory elements may each have two or more electrodes or contact lines, such as bit lines and word lines.

A three dimensional memory array is organized so that memory elements occupy multiple planes or multiple device levels, forming a structure in three dimensions (i.e., in the x, y and z directions, where the y direction is substantially perpendicular and the x and z directions are substantially parallel to the major surface of the substrate).

As a non-limiting example, each plane in a three dimensional memory array structure may be physically located in two dimensions (one memory level) with multiple two dimensional memory levels to form a three dimensional memory array structure. As another non-limiting example, a three dimensional memory array may be physically structured as multiple vertical columns (e.g., columns extending substantially perpendicular to the major surface of the substrate in the y direction) having multiple elements in each column and therefore having elements spanning several vertically stacked memory planes. The columns may be arranged in a two dimensional configuration, e.g., in an x-z plane, thereby resulting in a three dimensional arrangement of memory elements. One of skill in the art will understand that other configurations of memory elements in three dimensions will also constitute a three dimensional memory array.

By way of non-limiting example, in a three dimensional NAND memory array, the memory elements may be connected together to form a NAND string within a single horizontal (e.g., x-z) plane. Alternatively, the memory elements may be connected together to extend through multiple horizontal planes. Other three dimensional configurations can be envisioned wherein some NAND strings contain memory elements in a single memory level while other strings contain memory elements which extend through multiple memory levels. Three dimensional memory arrays may also be designed in a NOR configuration and in a ReRAM configuration.

A monolithic three dimensional memory array is one in which multiple memory levels are formed above and/or within a single substrate, such as a semiconductor wafer. In a monolithic three dimensional array, the layers of each level of the array are formed on the layers of each underlying level of the array. One of skill in the art will understand that layers of adjacent levels of a monolithic three dimensional memory array may be shared or have intervening layers between memory levels. In contrast, two dimensional arrays may be formed separately and then packaged together to form a non-monolithic memory device. For example, non-monolithic stacked memories have been constructed by forming memory levels on separate substrates and adhering the memory levels atop each other. The substrates may be thinned or removed from the memory levels before bonding, but as the memory levels are initially formed over separate substrates, such memories are not monolithic three dimensional memory arrays. Further, multiple two dimensional memory arrays or three dimensional memory arrays (monolithic or non-monolithic) may be formed separately and then packaged together to form a stacked-chip memory device.

Associated circuitry is typically required for proper operation of the memory elements and for proper communication with the memory elements. This associated circuitry may be on the same substrate as the memory array and/or on a separate substrate. As non-limiting examples, the memory devices may have driver circuitry and control circuitry used in the programming and reading of the memory elements.

One of skill in the art will recognize that this invention is not limited to the two dimensional and three dimensional exemplary structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the preferred embodiments described herein can be used alone or in combination with one another.

What is claimed is:

1. A storage module comprising:
   a memory; and
   a storage controller in communication with the memory, wherein the storage controller is configured to find a last-written page in a block in the memory by:
   (a) sending a command to the memory to read a page of data, wherein the storage controller instructs the memory to read the page of data using a sense time that is shorter than a sense time used to read a page of data in response to a read request from a host controller;
   (b) receiving at least some of the data from that page in response to the command;
   (c) analyzing the at least some of the data from that page to determine if that page is a written page; and
   (d) repeating (a)-(c) for different pages in the block until the last-written page is found.

2. The storage module of claim 1, wherein the storage controller instructs the memory to read the page of data using a sense time of about 15 micro-seconds, and wherein the sense time used to read a page of data in response to a read request from a host controller is about 40 micro-seconds.

3. The storage module of claim 1, wherein the at least some of the data received by the storage controller in (b) is less than an amount of data received when reading a page of data in response to a read request from a host controller.

4. The storage module of claim 3, wherein the at least some of the data received by the storage controller in (b) is 100 bytes, and wherein the amount of data received when reading a page of data in response to a read request from a host controller is 4 kilobytes.

5. The storage module of claim 3, wherein the at least some of the data is just the parity bits of an error correction code (ECC) codeword.

6. The storage module of claim 1, wherein (a)-(d) are performed during boot up of the storage module.

7. The storage module of claim 1, wherein the memory is a three-dimensional memory.

8. The storage module of claim 1, wherein the storage module is embedded in a host comprising the host controller.

9. The storage module of claim 1, wherein the storage module is removably connected to a host comprising the host controller.

10. The storage module of claim 1, wherein the storage module is a solid-state drive.

11. A method for finding a last-written page in a block in memory, the method comprising:
    performing the following in a storage controller in communication with a memory:
    (a) sending a command to the memory to read a page of data, wherein the storage controller instructs the memory to read the page of data using a sense time that is shorter than a sense time used to read a page of data in response to a read request from a host controller;
    (b) receiving at least some of the data from that page in response to the command;
    (c) analyzing the at least some of the data from that page to determine if that page is a written page; and
    (d) repeating (a)-(c) for different pages in the block until the last-written page is found.

12. The method of claim 11, wherein the storage controller instructs the memory to read the page of data using a sense time of about 15 micro-seconds, and wherein the sense time used to read a page of data in response to a read request from a host controller is about 40 micro-seconds.

13. The method of claim 11, wherein the at least some of the data received by the storage controller in (b) is less than an amount of data received when reading a page of data in response to a read request from a host controller.

14. The method of claim 13, wherein the at least some of the data received by the storage controller in (b) is 100 bytes, and wherein the amount of data received when reading a page of data in response to a read request from a host controller is 4 kilobytes.

15. The method of claim 13, wherein the at least some of the data is just the parity bits of an error correction code (ECC) codeword.

16. The method of claim 11, wherein (a)-(d) are performed during boot up of the storage module.

17. The method of claim 11, wherein the memory is a three-dimensional memory.

18. The method of claim 11, wherein the storage module is embedded in a host comprising the host controller.

19. The method of claim 11, wherein the storage module is removably connected to a host comprising the host controller.

20. The method of claim 11, wherein the storage module is a solid-state drive.

21. A storage module comprising:
    a memory; and
    a storage controller in communication with the memory, wherein the storage controller is configured to find a last-written page in a block in the memory by:
    (a) sending a command to the memory to read a page of data;
    (b) receiving at least some of the data from that page in response to the command, wherein the at least some of the data received by the storage controller is less than an amount of data received when reading a page of data in response to a read request from a host controller, wherein the at least some of the data is just the parity bits of an error correction code (ECC) codeword;
    (c) analyzing the at least some of the data from that page to determine if that page is a written page; and
    (d) repeating (a)-(c) for different pages in the block until the last-written page is found.

22. The storage module of claim 21, wherein the at least some of the data received by the storage controller in (b) is 100 bytes, and wherein the amount of data received when reading a page of data in response to a read request from a host controller is 4 kilobytes.

23. The storage module of claim 21, wherein (a)-(d) are performed during boot up of the storage module.

24. The storage module of claim 21, wherein the memory is a three-dimensional memory.

25. The storage module of claim 21, wherein the storage module is embedded in a host comprising the host controller.

26. The storage module of claim 21, wherein the storage module is removably connected to a host comprising the host controller.

27. The storage module of claim 21, wherein the storage module is a solid-state drive.

28. A method for finding a last-written page in a block in memory, the method comprising:
 performing the following in a storage controller in communication with a memory:
  (a) sending a command to the memory to read a page of data;
  (b) receiving at least some of the data from that page in response to the command, wherein the at least some of the data received by the storage controller is less than an amount of data received when reading a page of data in response to a read request from a host controller, wherein the at least some of the data is just the parity bits of an error correction code (ECC) codeword;
  (c) analyzing the at least some of the data from that page to determine if that page is a written page; and
  (d) repeating (a)-(c) for different pages in the block until the last-written page is found.

29. The method of claim 28, wherein the at least some of the data received by the storage controller in (b) is 100 bytes, and wherein the amount of data received when reading a page of data in response to a read request from a host controller is 4 kilobytes.

30. The method of claim 28, wherein (a)-(d) are performed during boot up of the storage module.

31. The method of claim 28, wherein the memory is a three-dimensional memory.

32. The method of claim 28, wherein the storage module is embedded in a host comprising the host controller.

33. The method of claim 28, wherein the storage module is removably connected to a host comprising the host controller.

34. The method of claim 28, wherein the storage module is a solid-state drive.

* * * * *